June 2, 1931.  C. A. HARPMAN  1,808,550
HEAT DISTRIBUTOR FOR COOK STOVES
Filed April 18, 1930
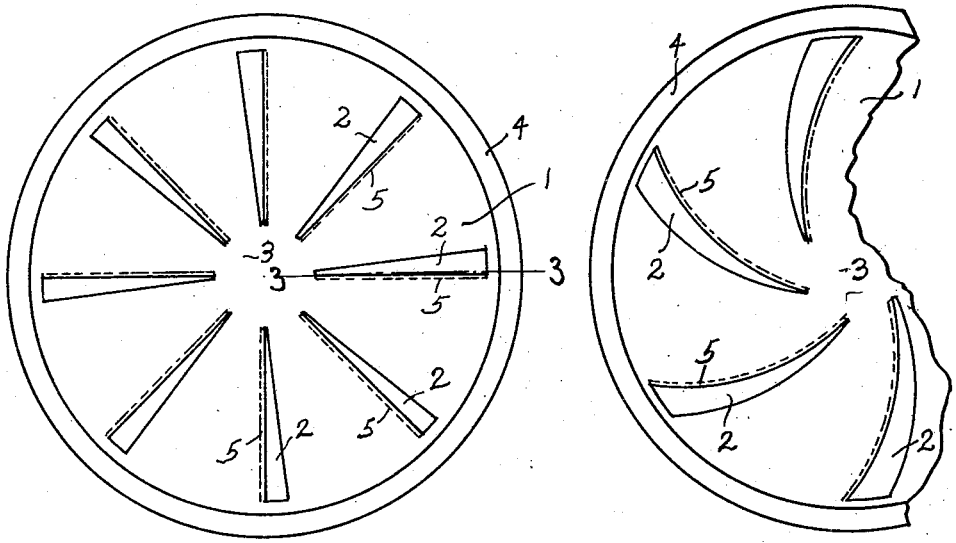
Fig. 1
Fig. 2
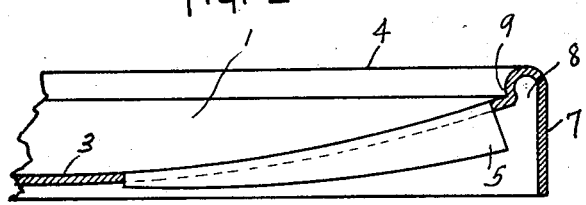
Fig. 3
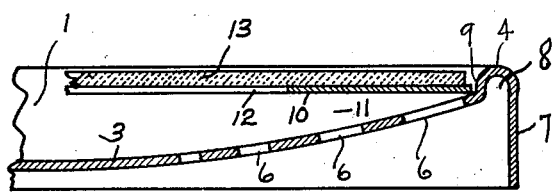
Fig. 4
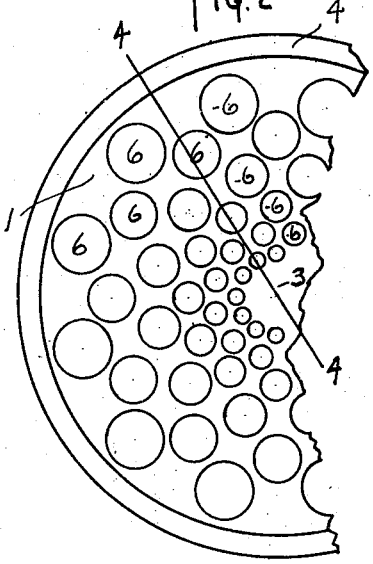
Fig. 5
Charles A. Harpman
INVENTOR.
BY
ATTORNEY.

Patented June 2, 1931

1,808,550

UNITED STATES PATENT OFFICE

CHARLES A. HARPMAN, OF YOUNGSTOWN, OHIO

HEAT DISTRIBUTOR FOR COOK STOVES

Application filed April 18, 1930. Serial No. 445,489.

This invention relates to heat distributors and especially to devices of this class in distributing heat over gas burners or over a lid opening over a cook stove.

The principal object of this invention is to provide a device for distributing heat coming from a burner or fuel used in a cook stove so that the heat may be distributed under all areas of a bottom of a kettle, pot or pan placed upon said distributor.

A further object of the invention is to provide a heat distributor of the class described having a plurality of radial openings, said radial openings enlarged as they extend outwardly.

A further object of the invention is to provide downwardly depended deflecting fins secured to one edge of each of said plurality of radial openings.

A further object of the invention is to provide a heat distributor of the class described having a plurality of perforations, said perforations extending near a center portion of the device and increasing in size as these perforations extend outwardly.

A further object of the invention is to provide a detachable reducing ring.

A still further object of the invention is to provide a detachable pad.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a top plan view of the device.

Figure 2 is a top plan view showing a modification.

Figure 3 is a cross section taken on line 3—3 of Fig. 1.

Figure 4 is a cross section taken on line 4—4 of Fig. 5.

Figure 5 is a modification of Fig. 1.

In carrying out this invention I make use of a sheet metal body member 1 having the form of a concave disk. By referring to Fig. 1 it will be seen that the body member 1 has a plurality of radial openings 2, starting at a point adjacent to a central portion 3 of the body member 1 and enlarging as they extend to points adjacent to a periphery 4 of the body member 1. Each of the radial openings 2 is provided with a depended deflecting fin 5 formed from the cut-out material in providing the radial openings 2.

By referring to Fig. 2 it will be seen that the body member 1 has been modified in that the plurality of radial openings 2 are spiral in form and the attached deflected fins 5 are consequently spiral in form giving a rotary motion to the flame and heated air directly underneath a cooking utensil placed upon this device. In view of the fact that the body member 1 is concave no portion of the cooking utensil excepting its outer periphery of its bottom comes in actual contact with the body member 1. The heat of the flame and air is thereby subjected to the cooking utensil by two means, viz—one by transfer of heat from metal to metal by contact. A second way by the transfer of heat from the flame heating up the body member 1 and transferred through an air-space between the body member 1 and the interior area of the cooking utensil resting upon the device.

By referring to Fig. 5 it will be seen that the body member 1 is provided with a plurality of perforations 6, said perforations extending from a central portion 3 of the device and increasing in size as these perforations extend outwardly to a point adjacent the periphery of the body member 1.

The object of the perforations being arranged as described is to provide means for distributing heat evenly underneath the cooking utensil.

By referring to Figs. 3 and 4 it will be seen that the periphery 4 is slightly raised and then extends downwardly forming a base portion 7. The interior 8 of the periphery 4 forms a circular heat passage in order that the inner portion 9 of the periphery 4 may become more uniformly heated.

By referring to Fig. 4 it will be seen that I have provided a detachable reducing ring 10 which is utilized for the purpose of providing a support which would hold the cooking utensil when small, in a central position so that no part of the same comes in direct contact with the body member 1. It will be seen that in this event a heated area 11 beyond an inner edge 12 of the detachable reducing ring 10 is formed. It will also be seen that I have provided a detachable pad 13, preferably made of asbestos and which may be placed upon the upper side of the detachable reducing ring 10 or may be used without the detachable reducing ring 10, when it is desired to insure an efficient but safe means of preventing matter within the cooking utensil from burning One of the objectionable features of cooking over a flame is that the center portion of the cooking utensil is subjected to a greater heat than the outer portions of the utensil bottom. The cooking process within the utensil cannot proceed with safety beyond a temperature that would scorch or burn matter within the utensil at a central area. In this device the heat is more evenly distributed and more economy is provided in the utilization of the heat units required in carrying on the preparation of foods by heat.

What I claim is:—

In a device of the class described, a body member, a base for said body member, said body member having the form of a concave disk, a plurality of radial openings, said radial openings starting at a point adjacent to a central portion of said body member and enlarging as they extend to points adjacent to an outer circumference of said body member, a depended deflecting fin formed from material cut out from said openings, a detachable reducing ring functioning with said body member, a detachable pad positioned above said detachable reducing ring.

In testimony whereof I affix my signature.

CHARLES A. HARPMAN.